United States Patent
Galt et al.

(10) Patent No.: US 6,898,274 B1
(45) Date of Patent: May 24, 2005

(54) METHOD AND APPARATUS FOR ADAPTIVE TIME-BASED CALL ROUTING IN A COMMUNICATIONS SYSTEM

(75) Inventors: Walter Bruce Galt, Sachse, TX (US); James Bartoszewicz, Wylie, TX (US); Roy Sells, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/400,141

(22) Filed: Sep. 21, 1999

(51) Int. Cl.[7] .............................................. H04M 3/42
(52) U.S. Cl. .......................... 379/211.02; 379/211.03; 379/207.03
(58) Field of Search ..................... 379/211.02, 211.03, 379/207.03

(56) References Cited

U.S. PATENT DOCUMENTS

| | | | | |
|---|---|---|---|---|
| 4,313,035 A | * | 1/1982 | Jordan et al. .......... | 379/211.02 |
| 5,206,901 A | * | 4/1993 | Harlow et al. ......... | 379/211.04 |
| 5,243,645 A | * | 9/1993 | Bissell et al. .......... | 379/211.02 |
| 5,276,731 A | * | 1/1994 | Arbel et al. ........... | 379/211.02 |
| 5,329,578 A | * | 7/1994 | Brennan et al. ....... | 379/211.03 |
| 5,706,339 A | * | 1/1998 | Eisdorfer et al. ...... | 379/211.03 |
| 5,793,857 A |   | 8/1998 | Barnes et al. ................ | 379/207 |
| 5,867,569 A |   | 2/1999 | Martinez et al. ............ | 379/207 |
| 5,905,789 A |   | 5/1999 | Will ............................ | 379/211 |
| 6,104,799 A | * | 8/2000 | Jain et al. .............. | 379/211.01 |
| 6,330,322 B1 | * | 12/2001 | Foladare et al. ....... | 379/211.01 |
| 6,404,874 B1 | * | 6/2002 | Chestnut ................ | 379/211.02 |

* cited by examiner

*Primary Examiner*—Ahmad F. Matar
*Assistant Examiner*—Rasha Al-Aubaidi

(57) ABSTRACT

A method and apparatus in a communications system for routing a call. A call to a subscriber is received. Call routing information is identified for the subscriber. Responsive to identifying call routing information for the subscriber. A determination is then made as to whether a function has been selected for routing the call. Responsive to a determination that a function has been selected for routing the call, the call is routed using a sequence of destinations associated with the function. Responsive to an absence of a determination that the function has been selected for routing the call, the call is routed using a call routing scheduled based on time. Destinations to which calls are actually completed are monitored and the sequence in which destinations are selected and the sequence of destinations may be altered depending on the call completions made to destinations within the sequence of destinations.

41 Claims, 9 Drawing Sheets

METHOD AND APPARATUS FOR ADAPTIVE TIME-BASED CALL ROUTING IN A COMMUNICATIONS SYSTEM

FIELD OF THE INVENTION

The present invention relates generally to an improved communications system and in particular to a method and apparatus for routing calls in a communications system. Still more particularly, the present invention provides a method and apparatus for routing calls to a subscriber who may be contacted at one of a number of phones.

BACKGROUND OF THE INVENTION

Intelligent network (IN) or advanced intelligent network (AIN) provide mechanisms to create and support uniform telecommunications services. Intelligent network elements, tied together with signaling system no. 7 (SS7) or common channel signaling no. 7 (CCS7) provide an infrastructure to deliver a variety of new telecommunications services. Such signaling systems exchange transaction capabilities application part (TCAP) messages or queries between network elements to invoke selected services and ISDN-user part (ISUP) messages between network node switching elements to set up and route calls. The TCAP and ISUP messages are handled by a data communications system separate from the trunks which carry the calls themselves. The elements of such intelligent telephone systems include service switching points (SSPs) interconnected by trunks for carrying calls, and signal transfer points (STPs) and service control points (SCPs) connected to each other and the SSPs by SS7 data links for carrying signaling. A service control point (SCP) is an "intelligence center" with access to application databases enabling it to deliver various combinations of features, such as 1-800 number services and call redirection. A signal transfer point (STP) is a signaling hub or concentrator, typically connecting several service switching points to an SCP. A service switching point (SSP) is a network node normally associated with central office switch equipped with signaling system number 7 (SS7) messaging links to permit communication with the SCPs and which has special IN call processing software including a plurality of "Point-in-Call triggers" which can be provisioned or set to interrupt call processing momentarily and initiate a TCAP query to the SCP for instructions on how to complete the call processing. Based upon the instructions, the originating end office seizes a trunk to a neighboring switch and creates an initial address message which it sends to the neighboring switch via the signaling network. The initial address message includes various parameters which will control routing of the call to its destination.

Some services provided by AIN include, for example, intelligent caller data, disaster routing, call screening, automatic callback, and intelligent call redirection. Intelligent call redirection involves assigning a number to a subscriber by which callers may contact the subscriber at different locations or telephones. In this case, a telephone number is assigned to a specific person rather than to a physical telephone. When a call is made to a subscriber's telephone number, the call is routed to a telephone at one of a number of locations. If the user cannot be located at one of the locations, the call may be routed to a voice messaging system. Further, the call also may be routed to a cellular telephone or a pager. The primary difficulty in effectively implementing personal telephone numbers involves accurately determining to which physical telephone instrument to forward calls.

One approach in locating a subscriber follows a "find me" approach which typically forwards calls to a personal telephone number to different telephones according to a preset sequence until the subscriber is located. This approach involves defining the potential location of a subscriber and routing the calls to a telephone where the subscriber may be found at a particular time. One problem with this mechanism is that a subscriber may not keep a rigid schedule resulting in delays in finding the subscriber. These delays are caused because the caller must wait while the system rings each telephone number in the sequence three or four times before proceeding to the next telephone number if the subscriber does not answer the currently called telephone number.

Another approach involves a "follow me" approach, which forwards calls to a personal telephone number according to recent activity of the subscriber. This activity includes the subscriber engaging in credit card calls, credit card transactions, or automated teller transactions indicating the location of the subscriber. When such an activity is performed, the location of the individual, potentially including the telephone number, is recorded in a database that tracks the location of the subscriber. Calls can then be forwarded to the specific telephone number associated with the last known location of the subscriber, or to the telephone number in the subscriber's defined list of calls that is nearest to the last known location as indicated by the area code, cellular region, paging area, etc.

One problem with this approach is that it provides a forwarding location for calls to a personal telephone number that may be available for only a limited time. The new number is valid only as long as the subscriber stays at the location where he performed that activity.

Therefore, it would be advantageous to have an improved method and apparatus for locating and calling a subscriber having a telephone number that is routable to a number of different locations.

SUMMARY OF THE INVENTION

The present invention provides an improved method and apparatus for routing a call to a subscriber who may be reached at a number of different locations. The present invention includes a mechanism that is function based rather than time based for locating a subscriber at different locations. The function may be, for example, "at home" or "going to work". More specifically, a method in a communications system for routing a call includes receiving a call request to a subscriber and identifying call routing information for the subscriber. In order to identify call routing information for the subscriber, a determination is made as to whether function based routing has been selected. If so, the call may be routed using a sequence of destinations associated with the function. If function based selection is not active, then the call is routed using a scheduled based on time.

The present invention also allows for automatically changing and extending routing information. The changes may be based on successful call completions to different destinations. These changes are made both for the call routing schedule and the function. An interface is provided to the user to select the type of call location mechanism, call routing schedule or function. The interface may be, for example, be provided over the Internet or through a telephone device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
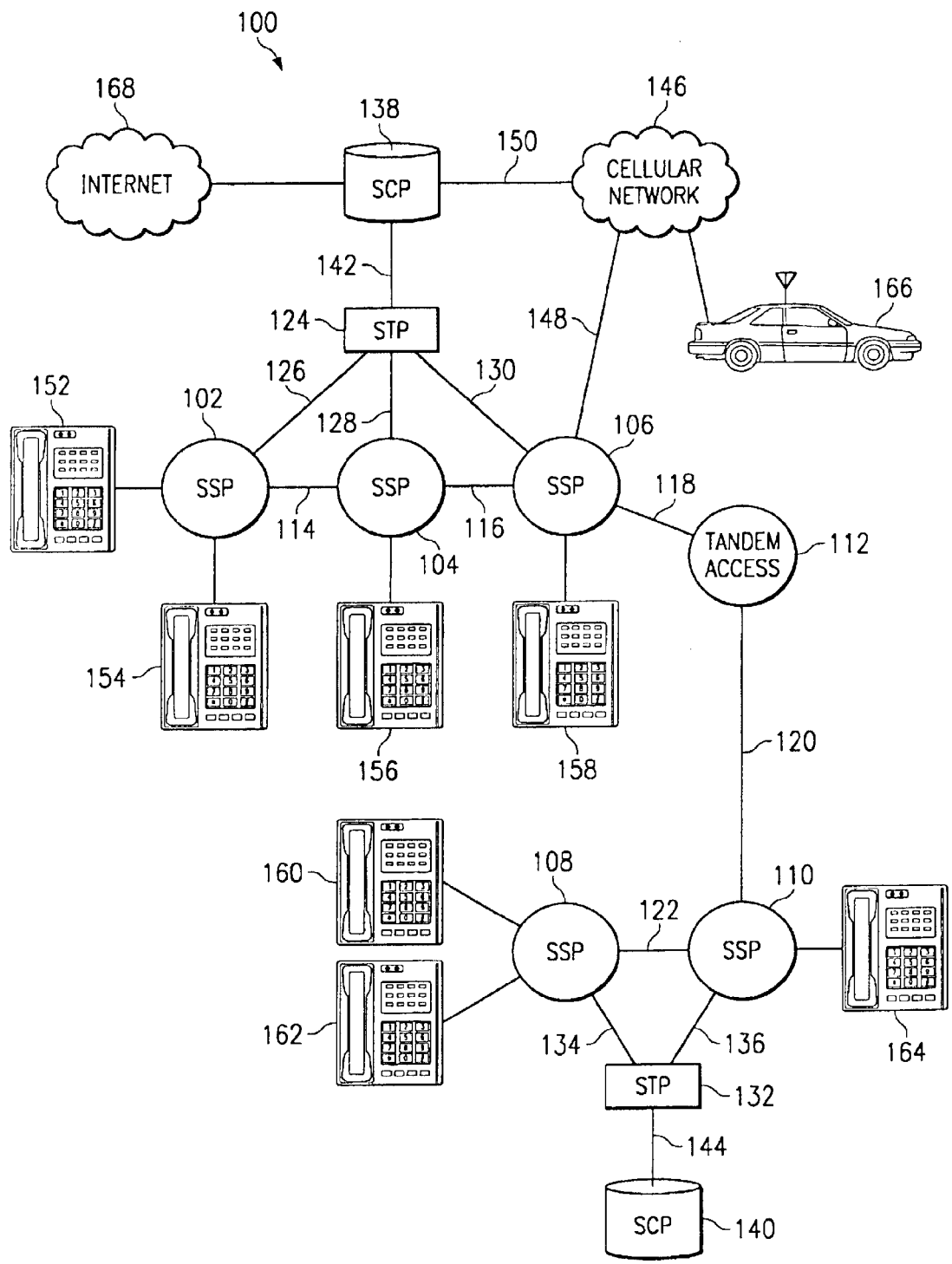
FIG. 1 is a block diagram of a communications system depicted in accordance with a preferred embodiment of the present invention.

With reference now to the figures and in particular with reference now to FIG. 1, a block diagram of a communications system is depicted in accordance with a preferred embodiment of the present invention. Communications system 100 is an example of a communications system in which the processes and apparatus of the present invention may be implemented to provide a more user friendly and more efficient mechanisms for routing calls to a subscriber who may be contacted at one of a number of telephones or other communication devices based on their current activity schedule.

Communications system 100 includes service switching points (SSPs) 102–112 interconnected by T1 trunks 114–122. A SSP is a local exchange in a telephone network. A SSP may be a combination of a voice switch and SS7 switch or an adjunct computer connected to the voice switch of a local exchange. Each switch includes a switch fabric with input and output ports used to route a call to a destination. The SSP provides the functionality of communicating with the voice switch via the use of primitives in creating packets, or signal units, needed for transmission in a SS7 network. In routing calls, a SSP will send requests or queries to a database to determine where to route a call. The SSP will use the information provided by the call party, such as dialed digits, to determine how to connect the call. In this example, SSP 112 is a tandem access SSP, which is employed to provide access between networks within communications system 100, such as providing a connection between two local exchange carriers (LECs) within communications system 100. For example, SSP 102–106 may be located in one LEC while SSPs 108–110 may be located in another LEC. SSPs 102–106 are connected to signaling transfer (STP) 124 by signaling links 126–130 while SSPs 108–110 are connected to STP 132 by signaling links 134 and 136.

All SS7 packets travel from one SSP to another through the services of a STP. The STP serves as a router in the SS7 network. The STP also is typically adjunct to a voice switch. Also found in communications system 100 are service control points (SCPs) 138 and 140. SCP 138 is connected to STP 124 by signaling link 142 while SCP 140 is connected to STP 132 by signaling link 144. A SCP serves as an interface to various databases, which may contain information about subscriber services, routing of special service numbers, calling card validation and fraud protection, and AIN services. The SCP is usually a computer used as a front end to a computer database.

Each SSP may communication with a SCP, such as SCP 138 or 140 using TCAP messages to ascertain a particular call. A SCP may communicate with other SCPs by means of ISDN user part initial address messages (ISUP-IAM) to set up trunk connections for calls.

Further, communications system 100 includes a cellular network 146 which has a connection to SSP 138 through T1 line 148. Signaling and routing information may be sent between STP 124 and cellular network 136 through signaling line 150. Telephone devices, such as telephones 152–164 are connected to SSPs 102–106 and SSPs 108 and 110 in communications system 100. Through this network, a user at one telephone may call a user at another telephone or a user at a mobile station, such as mobile station 166 in cellular network 146. Additionally, communications system 100 may include Internet 168, which provides a mechanism for a subscriber to access subscriber information stored in a SCP 138. Communications system 100 may exclude shown components and/or include other components not shown in the depicted example. The illustration in FIG. 1 is not meant to imply architectural limitations on the present invention.

The present invention provides a method, apparatus, and instructions for using information from successful call attempts to modify the call sequences in order to favor call set up to the location that is identified as having previously answered calls during a specific time period. For example, a subscriber may be located at different locations or telephones depending on the time of the day and the day of the week. The calling sequence may identify different numbers at which the subscriber may be contacted. Furthermore, if the subscribers uses the service as a full personal agent environment to which they place calls then the system notes the last used caller line identification (CLI) of the subscriber and uses that as a potential contact location.

The mechanism of the present invention also allows a subscriber to setup the sequence of numbers to call the subscriber based on functions or activities of the subscriber. These functions may be, for example, in the car, at work, at home, golfing, or at the gym in which the function is associated with a particular number or list of numbers. A mechanism in the form of a graphical user interface (GUI) is provided to allow a subscriber to setup and change the sequence of numbers used to reach the subscriber. This sequence of numbers is also referred to as a routing list or call routing schedule. The function may be setup using time slots or activated by the subscriber through the GUI or a series of digits using a phone menu system. The activated function may stay activated until cancelled or until after a selected period of time. When such a function is not active, the time based routing mechanism is used.

Figure 2:
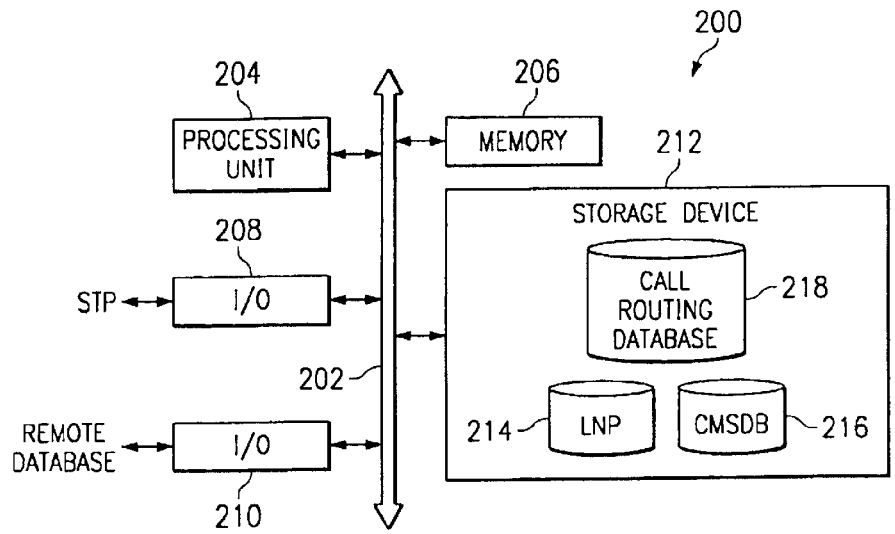
FIG. 2 is a block diagram of a service control point (SCP) depicted in accordance with a preferred embodiment of the present invention.

With reference now to FIG. 2, a block diagram of a service control point (SCP) is depicted in accordance with a preferred embodiment of the present invention. The process of the present invention may be implemented within SCP 200.

SCP 200 is an example of a SCP in which the process of the present invention may be implemented. SCP 200 includes a bus 202 interconnecting a processing unit 204, memory 206, input/output (I/O) unit 208, I/O unit 210, and storage device 212. Storage device 212 includes a number of databases, such as, for example, line number portability (LNP) 214, call management services database (CMSDB) 216, and call routing database 218. Calls to a subscriber may be received from a STP through I/O unit 208. In addition, SCP 200 may access other databases located remotely from SCP 200 through I/O unit 210. For example, a business services database (BSDB) is used to allow subscribers to store call processing instructions, network management procedures, and other data relevant to a private network of the subscriber. Such a database is not located within SCP 200, but may be accessed through I/O unit 210.

In the depicted example, information relating to routing lists or sequences of numbers used to call a subscriber may be stored within call routing database 218. The instructions for executing the processes of the present invention may be stored within memory 206 and executed by processing unit 204.

Figure 3:
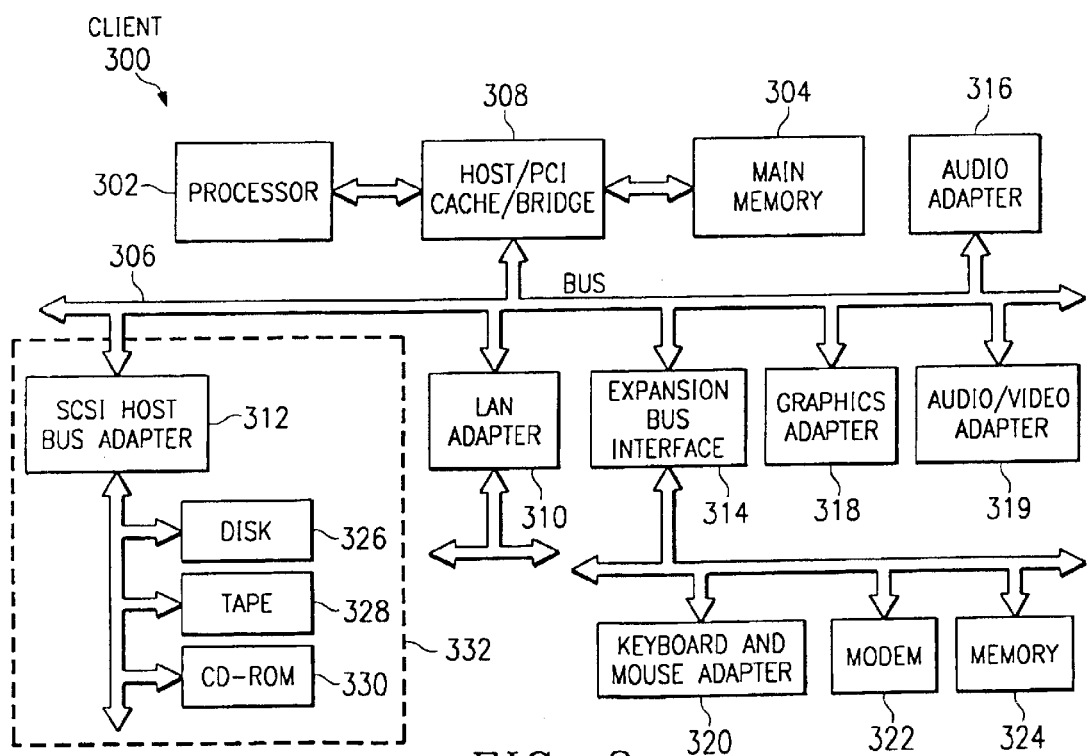
FIG. 3 is a block diagram illustrating a data processing system in which the present invention may be implemented.

With reference now to FIG. 3, a block diagram illustrates a data processing system in which the present invention may be implemented. Data processing system 300 is an example of a computer at which a subscriber may set, modify, and activate various call routing functions of the present invention. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapters 316, graphic adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As a further example, data processing system 300 may be a Personal Digital Assistant (PDA) device which is configured with ROM and/or flash ROM in order to provide non-volatile memory for storing operating system files and/or user-generated data. Additionally, data processing system 300 may be a smart phone containing a processor and instructions used to set up and modify routing schedules and to turn on and turn off routing functions. Data processing system 300 may make these changes through a graphical user interface and a communications link to communications system 100 in FIG. 1. For example, a browser program, such as, for example, Netscape Communicator from Netscape Communications Corporation, may be used by a subscriber to access and modify subscriber information for routing calls.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
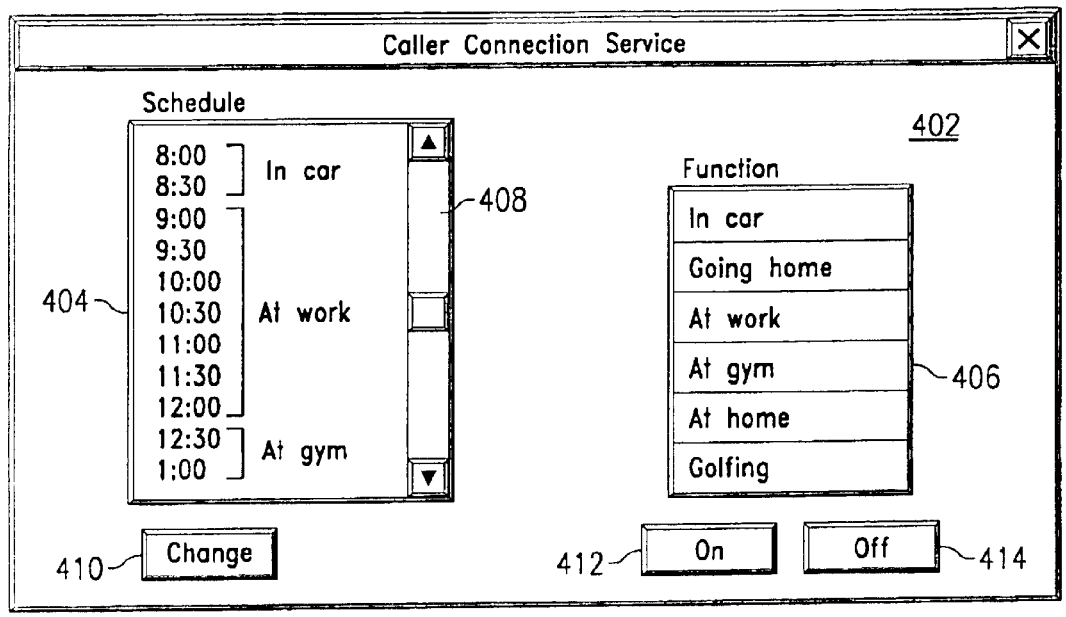
FIG. 4 is an illustration of an interface used to view and select routing sequences depicted in accordance with a preferred embodiment of the present invention.
Figure 5:
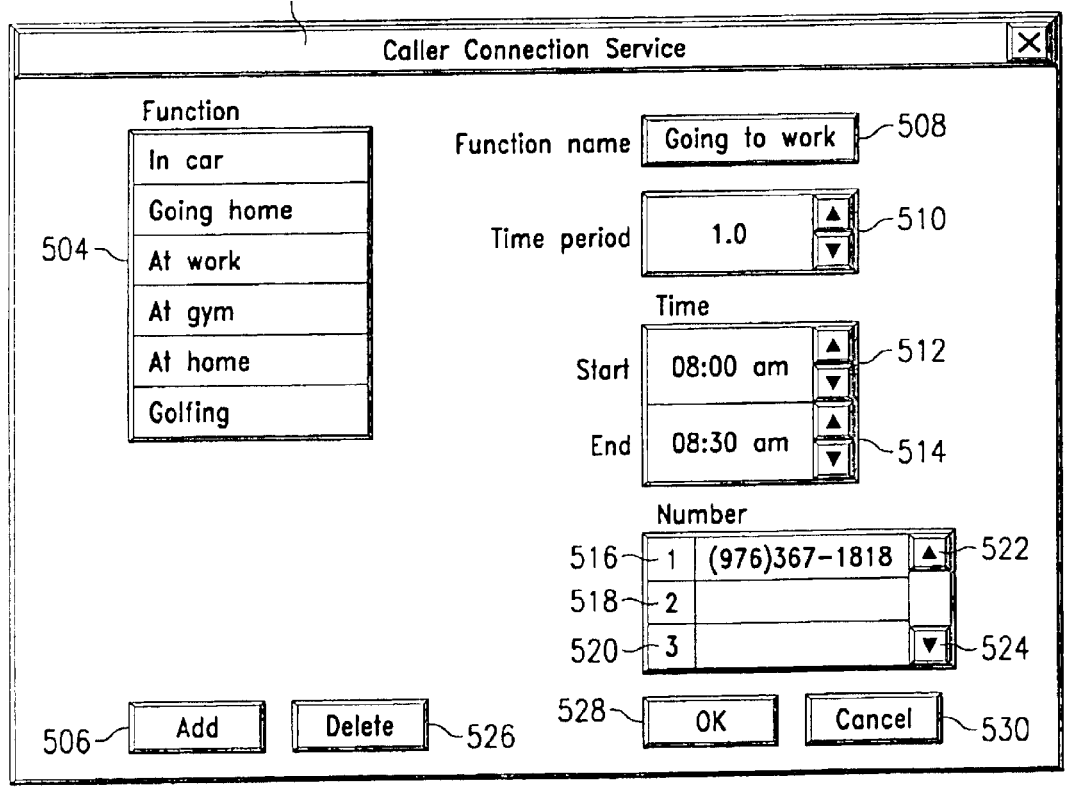
FIG. 5 is an illustration of a GUI used to set up and modify a routing schedule and functions in accordance with a preferred embodiment of the present invention.
Figure 6:
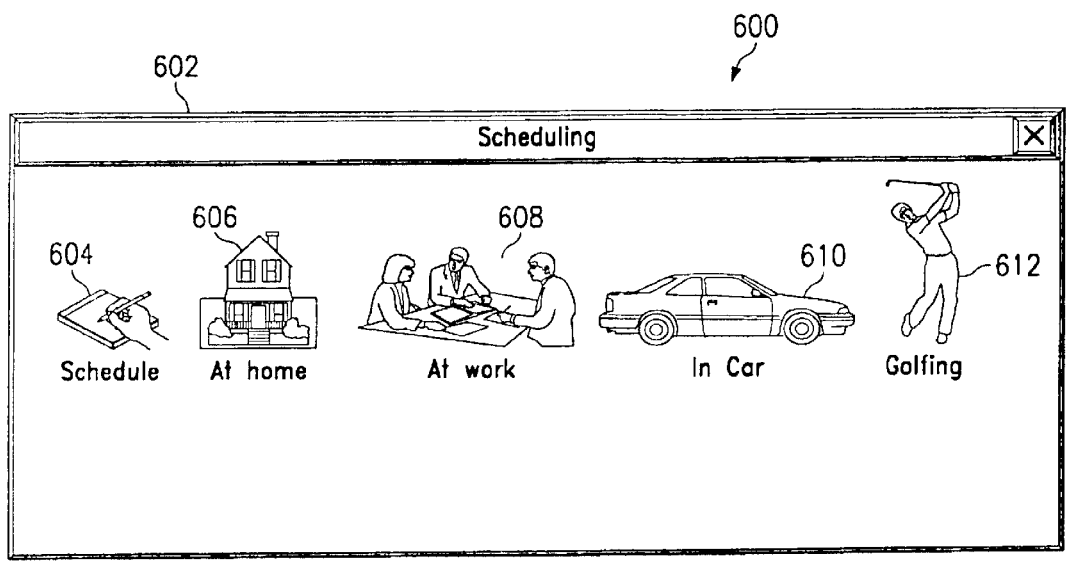
FIG. 6 is an illustration of a GUI in which a subscriber may change call routing of calls to the subscriber accordance with a preferred embodiment of the present invention.

FIGS. 4–6 illustrate graphical user interfaces (GUIs) that may be employed to allow a subscriber to set up and modify call routing information. The GUIs in these examples are windows displayed in a data processing system. The actual presentation may take different forms depending on the implementation. For example, the windows may be those for a browser that display pages received from a device or node, such as a SCP on the communications system. In such a case, the subscriber accesses the subscriber's routing information through the World Wide Web on the Internet via a TCP/IP connection. These GUIs are examples of an interface that may be used by a subscriber or other user to route calls based on a function or based on a call routing schedule that is time based. Interaction with the GUI causes messages or calls to be sent to the communications system to activate and deactivate different calling sequences depending on whether a function or call routing schedule is selected by the subscriber. In this manner an intuitive interface is provided to a subscriber to easily change the routing of calls to the subscriber.

With reference now to FIG. 4, an illustration of an interface used to view and select routing sequences is depicted in accordance with a preferred embodiment of the present invention. GUI 400 provides an interface on a data processing system, such as, for example, data processing system 300 in FIG. 3, to view and initiate call routing functions. The data processing system may take many forms, such as, for example, a personal computer, a personal digital assistant, or a digital wireless phone. The information viewed by the subscriber may be received by the data processing system over a communications link established to a SCP. Messages or request may be sent back to the SCP over the same link.

GUI 400 includes a window 402 containing a call routing schedule 404 and a function schedule 406. In the depicted example, call routing schedule 404 is a time-based schedule and shows that the subscriber is in the car between 8:00 a.m. and 8:30 a.m. From 8:30 a.m. to 12:00 p.m. the subscriber may be contacted at work. From 12:00 p.m. to 1:00 p.m. the subscriber is at the gym as shown in call routing schedule 404. Additional times and location are not shown, but may be viewed by manipulating scroll bar 408. Changes to the schedule displayed in call routing schedule 404 may be made by selecting change button 410. Additionally in window 402, function list includes selectable functions that may be activated by selecting "on" button 412. A selected function may be deactivated by selecting "off" button 414. In the depicted example, the functions include, "in car", "at work", "at home", and "at gym". By selecting a function and turning the function "on", call routing schedule 404 may be overridden such that calls are routed to the selected function.

With reference next to FIG. 5, an illustration of a GUI used to set up and modify a routing schedule and functions is depicted in accordance with a preferred embodiment of the present invention. GUI 500 contains a window 502 that is displayed in response to a selection of change button 410 in FIG. 4. Window 502 is used by a subscriber to change the call routing schedule.

Window 502 includes a function list 504 in which a number of different locations may be selected for use in calling the subscriber. Function list 504 is a list of functions that have been set up for the subscriber. In this example, "in car", "at work", "at gym", "at home", and "golfing" are the functions that have been set up for the subscriber. Selection of add button 506 will allow a user to add a new function in field 508. A time period for the function may be set in field 510. A time period allows for the user to set a length of time during which the function will be active and used in place of the call routing schedule, which is a time-based call routing schedule. After the time period has elapsed, the function will deactivate and calls made to the subscriber will be processed using the routing schedule. Additionally, the user may enter a start time in field 512 and an end time in field 514 during which a particular number associated with the function will be used to reach the subscriber. These two times are used to define a time slot. One or more numbers may be entered into fields 516, 518, and 520 for the particular function. These numbers are also referred to as directory numbers. Numbers may be entered into additional fields not shown. These fields may be shown by manipulating controls 522 and 524. The numbers entered in these fields have a priority used to call the subscriber. In this example, field 516 has the highest priority, field 518 has the next highest priority, and field 520 has the lowest priority. As a result, the number entered in field 516 will be called first when attempting to call the subscriber for the particular function. The number in field 518 will be called next if the subscriber cannot be reached at the number entered into field 516. "Delete" button 526 may be used to delete an entire function in function list 504. "Ok" button 520 is used to accept changes made by the subscriber. Selection of "Ok" button 520 causes any changes to be stored for use in routing calls for the subscriber. "Cancel" button 530 is used to cancel or prevent any changes entered by the subscriber from being stored or used to route calls.

Turning next to FIG. 6, an illustration of a GUI in which a subscriber may change call routing of calls to the subscriber is depicted in accordance with a preferred embodiment of the present invention. GUI 600 includes a window 602 in which a subscriber may select different routing options for calls made to the subscriber. In this example, schedule 604 is an icon or image that is selectable by the subscriber to initiate routing of calls based on a call routing schedule, which is time-based. Window 602 also displays "at home" 606, "at work" 608, "in car" 610, "golfing" 612, which are icons or images selectable by the subscriber to initiate call routing associated with a function with which the subscriber is familiar. Selection of one of these icons or images results in a request being sent to a SCP to use the destinations set up for the particular function to route calls to the subscriber. In the depicted examples, these destinations are represented by telephone numbers or other call routing information in a database used to route calls between a caller and a call party. If schedule 604 had been previously selected by the subscriber, a selection of one of the function icons or images will result in the calling sequence associated with selected icon or image being used in place of the call routing schedule. This replacement or change in call routing may remain in effect until a different function is selected or until the icon or image for the call routing schedule, schedule 604, is selected. Optionally, time period may be set for a function during which the calling sequence associated with the function will be used to route calls. When the time period expires, the routing will return to the call routing schedule or some other default function.

Figure 7:
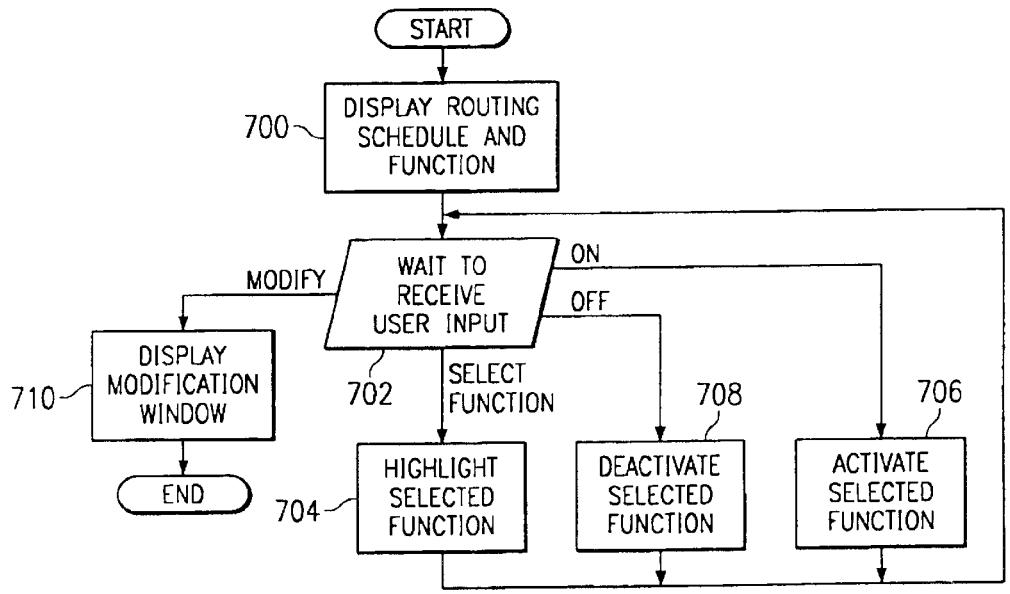
FIG. 7 is a flowchart for a process displaying a call routing schedule and functions accordance with a preferred embodiment of the present invention.

FIGS. 7–14 illustrate flowcharts of processes used in routing calls to a subscriber in which a call received for the subscriber may be routed to a number of destinations. With reference now to FIG. 7, a flowchart for a process displaying a call routing schedule and functions is depicted in accordance with a preferred embodiment of the present invention. The flowchart in FIG. 7 is employed to process input to the graphical user interface illustrated in FIG. 4. The process begins by displaying a window containing a call routing schedule and functions for a subscriber (step 700). This window may be window 402, as illustrated in FIG. 4. Thereafter, the process waits to receive user input (step 702). Upon receiving a user input that selects a function in the GUI, the selected function is highlighted (step 704) with the process then returning to step 702 to wait for additional user input. If the user input received is a selection of the "on" button, the selected function is activated (step 706) with the process returning to step 702. Activating the function using the "on" button results in calls to the subscriber being directed towards one or more numbers in an ordered list associated with the function. For example, if the function is "in car", a call to the subscriber is routed first to the users mobile number. If no answer is received at the users mobile number, then the call is routed to the user's work number. If no answer is received at the work number, the call may be routed to a voice mailbox for the user. The sequence of call routing is used in place of any sequence of numbers valid for the time in which the call was made. This function will continue until turned off. Alternatively, a time period may be set in which the function will take president over a time-based routing schedule. When the time period is expired, the time function will deactivate and the time-based routing schedule will again be used to route calls to the subscriber.

Selection of the "off" button as a user input results in the function being deactivated (step 708) with the process then returning to step 702. The deactivation of the function results in routing the calls using the time-based call routing schedule. Selection of the modify button results in a display of a modification window (step 710) with the process terminating thereafter. In the depicted examples, the modification window is window 502 in FIG. 5.

Figure 8:
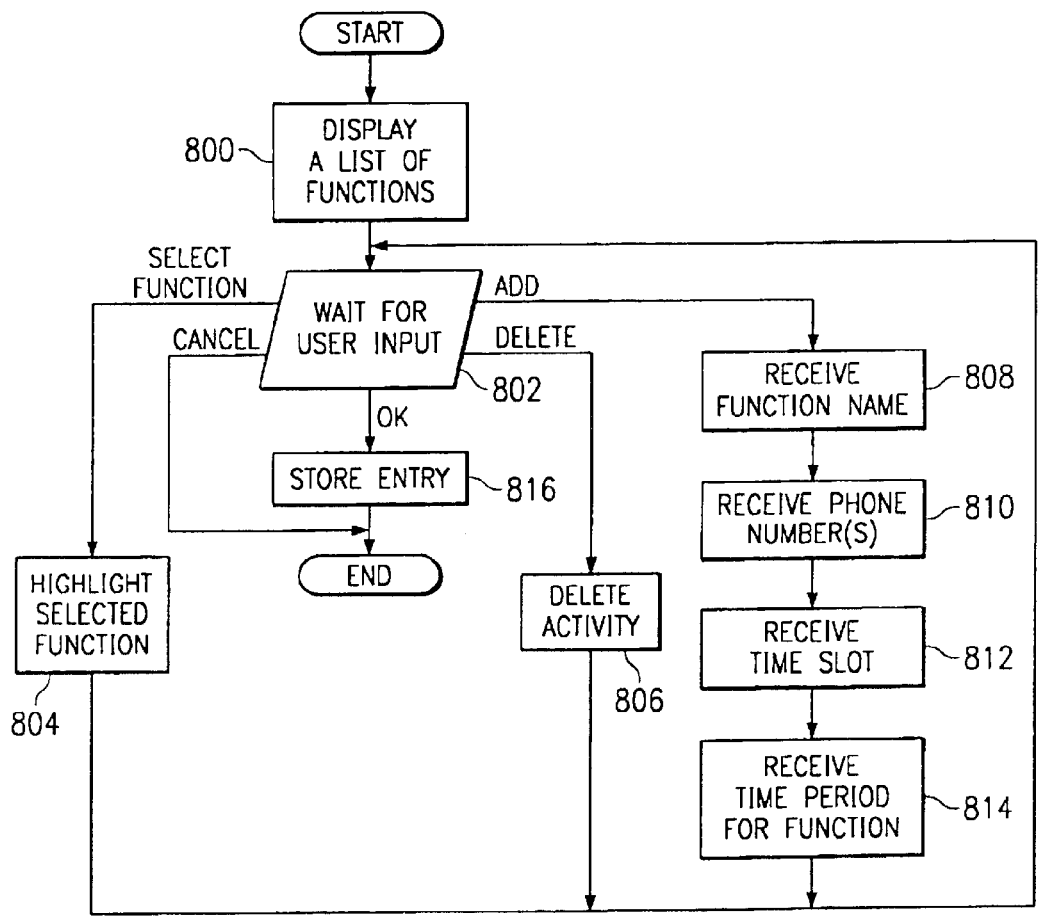
FIG. 8 is a flowchart of a process for modifying and adding functions depicted in accordance with a preferred embodiment of the present invention.

Turning now to FIG. 8, a flowchart of a process for modifying and adding functions is depicted in accordance with a preferred embodiment of the present invention. The process begins by displaying a list of functions for the subscriber (step 800). This display is in the form of a window, such as window 502 in FIG. 5. Thereafter, the process waits for user input (step 802). Upon receiving selection of a function, the selected function is then highlighted (step 804) with the process then returning to step 802 to wait for additional user input. Upon receiving selection of the delete button as an input, the selected function will be deleted from the list of functions (step 806) with the process then returning to step 802. Upon receiving user input to add a function, the process receives the function name (step 808). The function named received is entered in a field in the window. Thereafter, one or more phone numbers may be entered by the subscriber (step 810). These phone numbers may be placed in an order in which calls are to be routed to the subscriber. A time slot is entered (step 812). Entry of the time slot may be made by entering a start and stop time for the function. Additionally, a time period may be entered for the function (step 814) with the process then returning to step 802.

Upon receiving selection of okay button as an input, entries made in the fields for the function will be stored (step 816) with the process terminating thereafter. Receiving selection of the cancel button will result in the process terminating without saving any changes.

Figure 9:
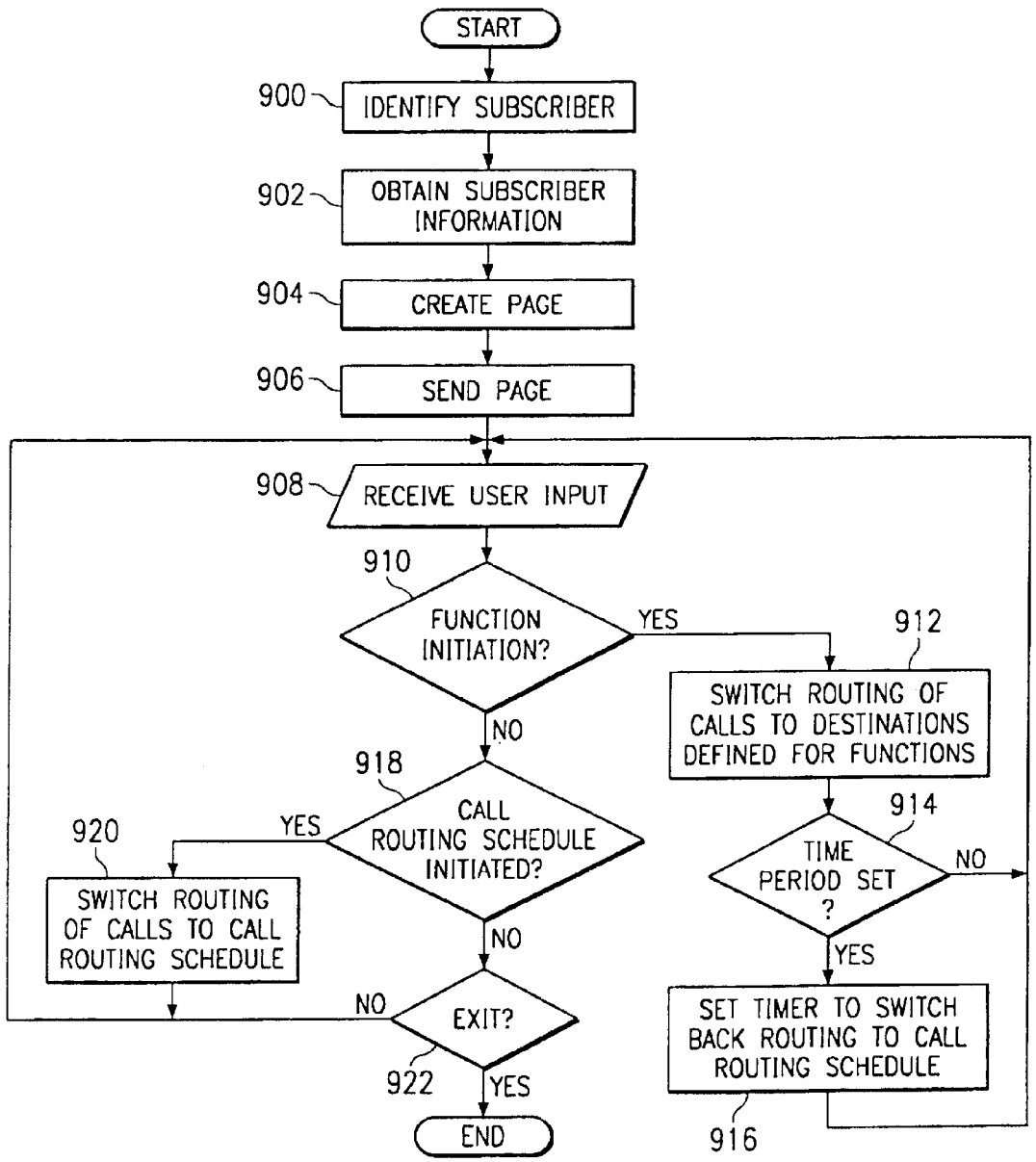
FIG. 9 is a flowchart of a process for routing calls in accordance with a preferred embodiment of the present invention.

In FIG. 9, a flowchart of a process for routing calls is depicted in accordance with a preferred embodiment of the present invention. This process is initiated when a subscriber requests a change in call routing options. In the depicted example, the request is made over the Internet using a TCP/IP connection. The process begins by identifying the subscriber making the request (step 900). Subscriber information is obtained from a database of subscribers, such as call routing database 218 in FIG. 2 (step 902). The information includes information needed to display various routing options for the subscriber. A page or display is created using the subscriber information (step 904), and the page is sent to the subscriber (step 906). The page is similar to GUI 700 in FIG. 7.

The process then receives user input (step 908). A determination is made as to whether the user input is one initiating a function (step 910). If the user input initiates a function for call routing, then the routing of the calls to the subscriber is switched to use a group of destinations to find for the selected function (step 912). Thereafter, a determination is made as to whether a time period has been set for this function (step 914). If a time period has been set or defined, a timer is set to indicate when the routing of calls should be switched back to the call routing schedule (step 916) with the process then returning to step 908. Otherwise, the process proceeds directly back to step 908. In step 916, the routing of calls may be switched back to some other group of destinations instead of those defined by the call routing schedule. For example, the routing of calls may be switched to some default function or the subscriber may be queried for another selection.

With reference again to step 910, if the user input is not a function initiation, a determination is made as to whether the user input initiates the call routing schedule (step 918). If the call routing schedule is to be initiated, the routing of calls for the subscriber is switched to a set of destinations defined in the call routing schedule (step 920) with the process then returning to step 908. Otherwise, a determination is made as to whether the subscriber has exited the process (step 922). If the subscriber has exited the process terminates. Otherwise, the process returns to step 908.

Figure 10:
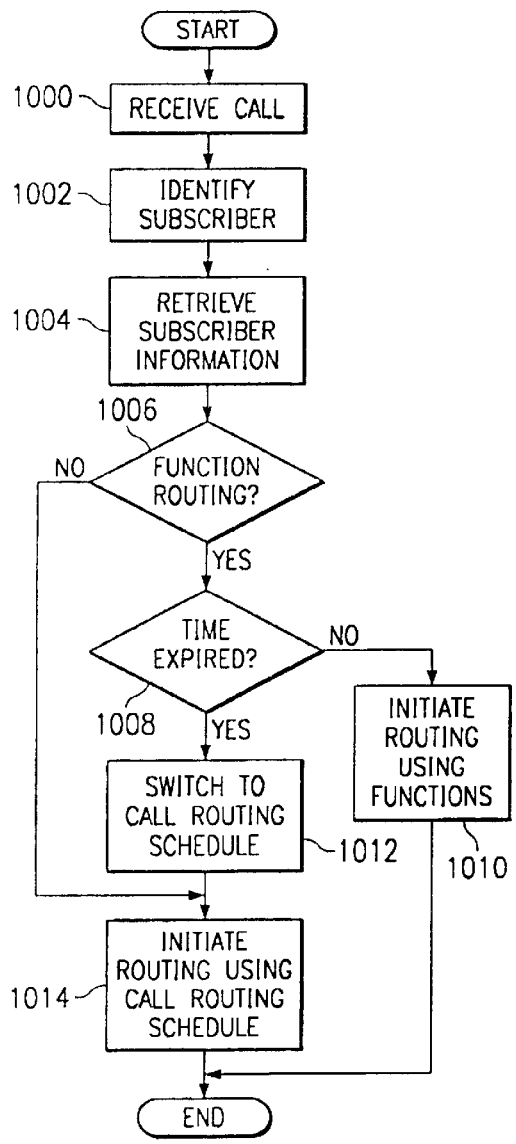
FIG. 10 is a flowchart of a process for routing calls in accordance with a preferred embodiment of the present invention.

Turning next to FIG. 10, a flowchart of a process for routing calls is depicted in accordance with a preferred embodiment of the present invention. The process begins by receiving a call from a caller to a subscriber (step 1000). The subscriber is then identified (step 1002). Subscriber information is retrieved for the identified subscriber (step 1004). A determination is then made as to whether routing is to be performed by a function selected by the subscriber (step 1006). If routing is to be made using a function, a determination is made as to whether a timer has expired for the selected function (step 1008). If the timer has not expired, then routing of the call is initiated using the selected function (step 1010) with the process terminating thereafter.

With reference again to step 1008, if the timer has expired, the process then switches to the call routing schedule (step 1012). Call routing is then initiated using the call routing schedule (step 1014) with the process terminating thereafter.

With reference again to step 1006, if routing is not to be made using a function, then process proceeds directly to step 1014 as described above.

Figure 11:
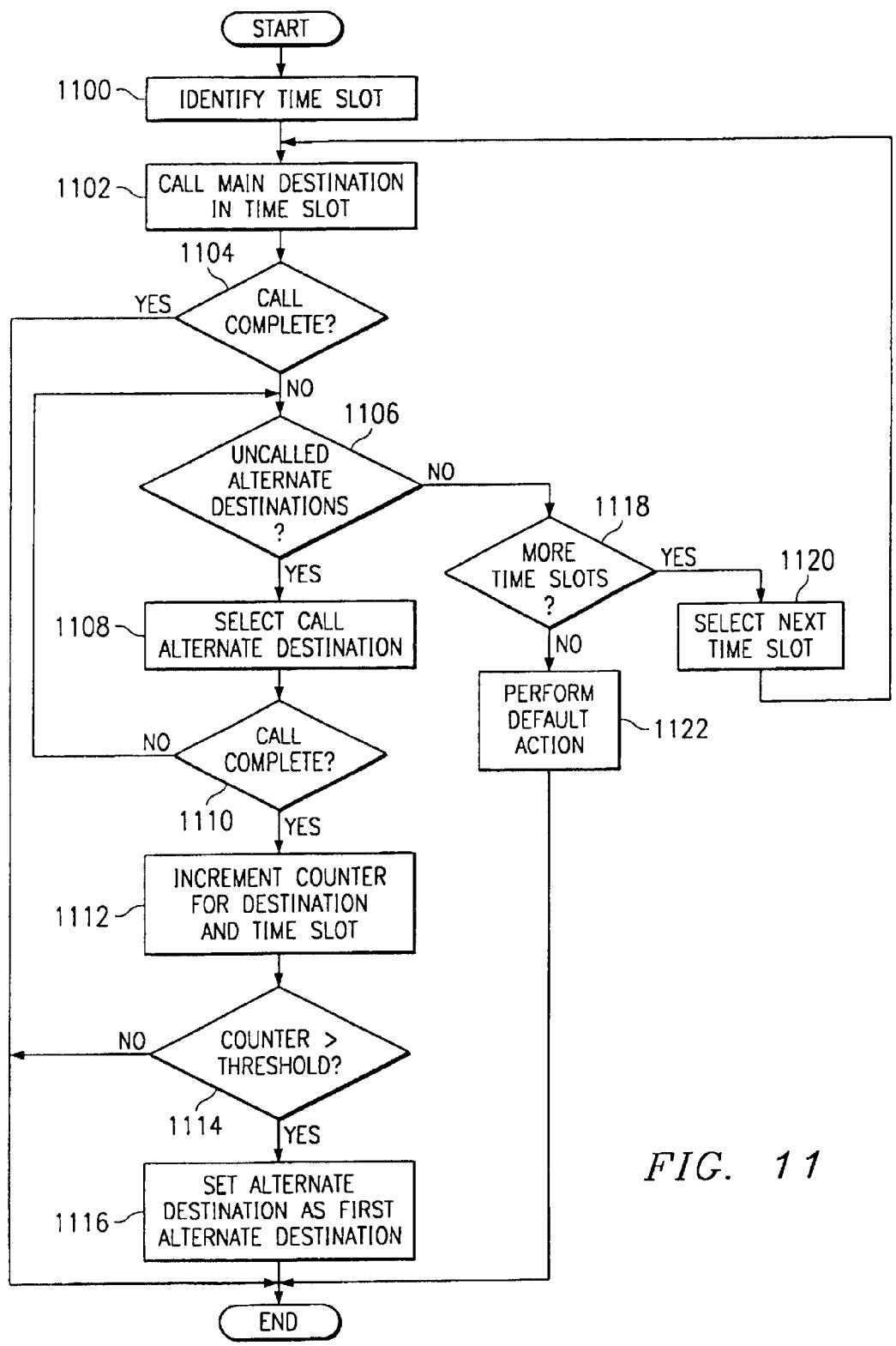
FIG. 11 is a flowchart of a process for routing a call to a subscriber using a call routing schedule in accordance with a preferred embodiment of the present invention.

With reference now to FIG. 11, a flowchart of a process for routing a call to a subscriber using a call routing schedule is depicted in accordance with a preferred embodiment of the present invention. The process begins by identifying in the call routing schedule, the current time slot that is to be used to route the call (step 1100). The main destination for the time slot is called (step 1102). The main destination in this example is the first number or the number having the highest priority that is associated with the time slot. Thereafter, a determination is made as to whether the call has been completed (step 1104). This determination is made by seeing whether the subscriber has answered the phone within a selected period of time. If the call has not been completed, A determination is then made as to whether there are uncalled alternate destinations present for the time slot (step 1106). If alternate destinations that have been uncalled are present, the next alternate destination is identified for the time slot and called (step 1108). Destinations for the time slot are placed in an order in which calls should be made to the subscriber. A determination is made as to whether the call has been completed (step 1110). If the call has not been completed, the process returns to step 1106.

With reference again to step 1110, if the call is completed, the process then increments a counter for the destination and time slot (step 1112). A determination is made as to whether the counter is greater than a threshold value (step 1114). The counter counts the number of successful connections to the destination. This counter is used to determine the likelihood of this destination being the preferred destination for this time period/function. If the counter is greater than a threshold value, the alternate destination is then set as the first alternate destination (step 1116) with the process terminating thereafter. In the depicted example, the threshold may be set to two. Thus, if three calls are successfully completed, the alternate destination will be set or made the first alternate destination. In the depicted examples, this change in step 1116 is temporary and good for a single day or 24-hour period.

With reference again to step 1106, if uncalled alternate destinations are not present for the time slot, a determination is made as to whether another time slot is present (step 1118). If another time slot is present, the next time slot in the sequence is selected (step 1120) with the process then returning to step 1102. If additional time slots are not present, a default action is performed (step 1122) with the process terminating thereafter. This default action may take various forms. For example, the caller may be given a message that the subscriber is unavailable. Alternatively, the caller may be sent to a voice mail box for the subscriber. With reference again to step 1104, if the call is completed, the process terminates, as does step 1114 if the threshold is less than the counter.

Figure 12:
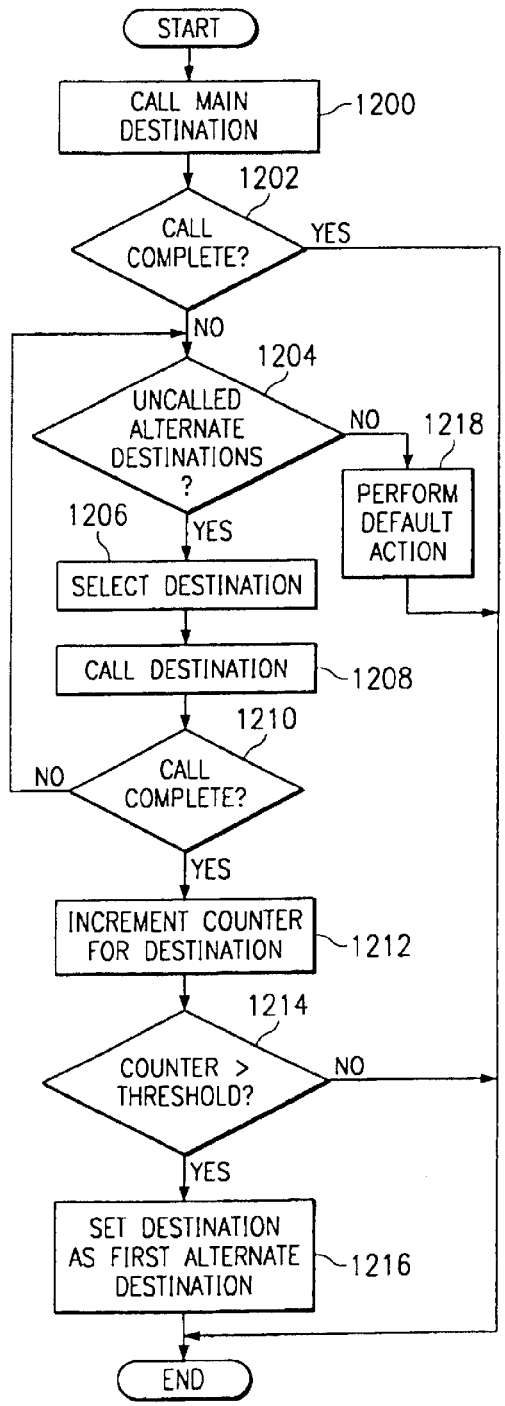
FIG. 12 is a flowchart for routing calls using a subscriber selected function in accordance with a preferred embodiment of the present invention.

In FIG. 12, a flowchart for routing calls using a subscriber selected function is depicted in accordance with a preferred embodiment of the present invention. The process begins by calling a main destination from a group of destinations associated with the selected function (step 1200). A determination is made as to whether the call was completed (step 1202). If the call was not completed, a determination is made as to whether uncalled alternate destinations are present (step 1204). If uncalled alternate destinations are present, the next destination is selected (step 1206). The group of destinations for the group of functions are placed in an order in which calls should be attempted. The selected destination is then called (step 1208). A determination is made as to whether the call to the alternate destination was completed (step 1210). If the call was not completed, the process returns to step 1204. Otherwise, the process then increments a counter for the destination (step 1212).

Next, a determination is made as to whether the counter is greater than a threshold value (step 1214). The counter counts the number of successful connections to the destination. This counter is used to determine the likelihood of this destination being the preferred destination for this time period/function. If the counter is greater than a threshold value, the alternate destination is then set as the first alternate destination (step 1216) with the process terminating thereafter. In the depicted examples, this change in step 1216 is temporary and good for a single day or 24-hour period. With reference again to step 1214, if the counter is not greater than the threshold, the process also terminates.

With reference again to step 1204, if uncalled alternate destinations are not present, then a default action is performed (step 1218) with the process terminating thereafter. This default action may be, for example, a message indicating the unavailability of the subscriber or sending the caller to a voice mail box for the subscriber. With reference again to step 1202, if the call to the main destination is completed, the process terminates.

Figure 13:
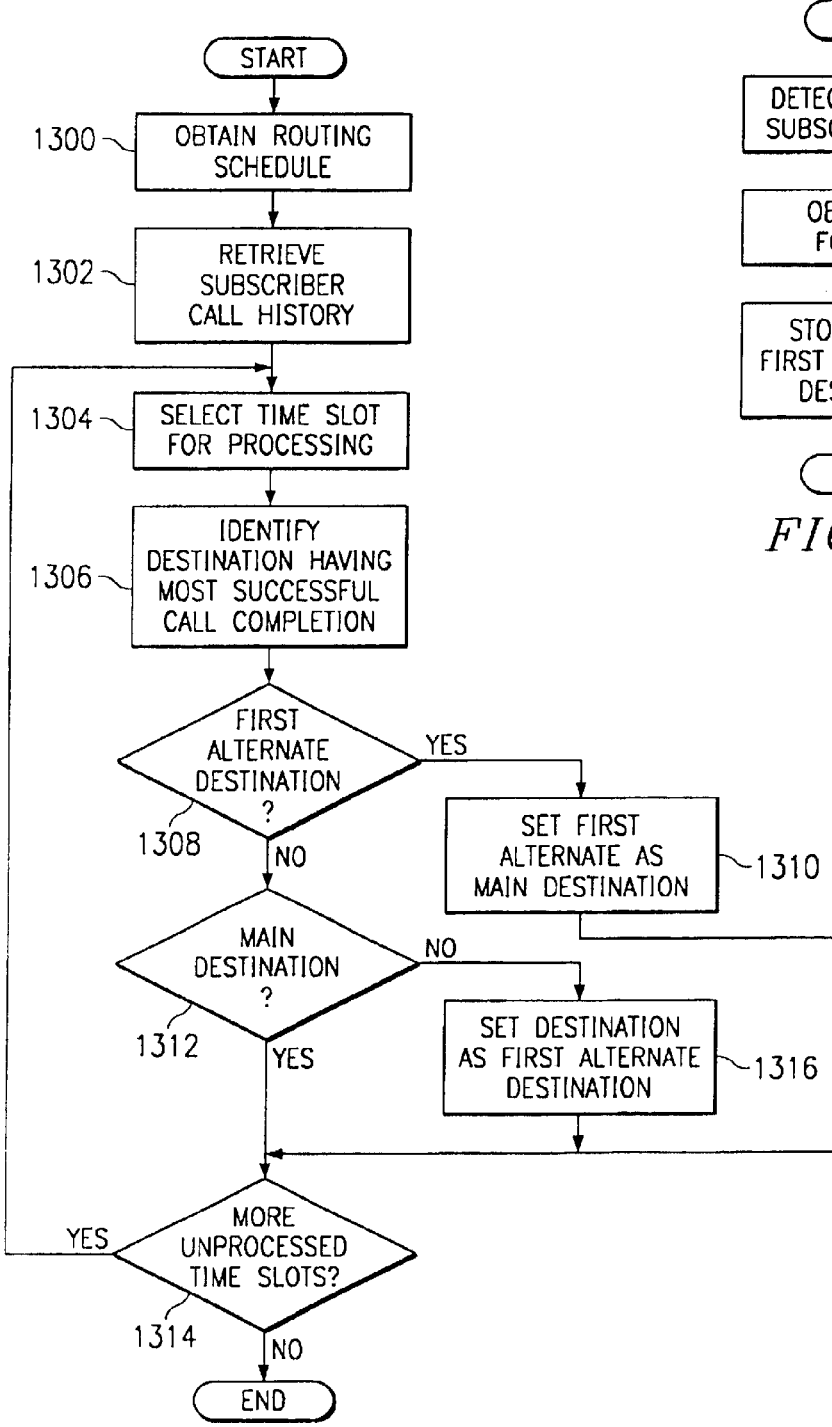
FIG. 13 is a flowchart of a process for making long term changes to a routing schedule in accordance with a preferred embodiment of the present invention.

With reference now to FIG. 13, a flowchart of a process for making long term changes to a routing schedule is depicted in accordance with a preferred embodiment of the present invention. The process begins by retrieving a routing schedule for the subscriber (step 1300). Next, a subscriber call history is retrieved (step 1302). The time period for this history may vary depending on the implementation. For example, the history may be a one week period or a one month period. The process selects a time slot from the routing schedule for processing (step 1304). The destination having the most successful call completions is identified (step 1306). A determination is then made as to whether this destination is a first alternate destination (step 1308). If the destination is the first alternate destination, the destination is then set as the main destination for the time slot (step 1310). A determination is then made as to whether more unprocessed time slots are present (step 1314). If additional unprocessed time slots are present, the process returns to step 1304. Otherwise, the process terminates.

With reference again to step 1308, if the destination is not a first alternate destination, a determination is made as to whether the destination is the main destination (step 1312). If the destination is not the main destination, then the destination is set as the first alternate destination (step 1316) with the process then proceeding to step 1314 as described above. If the destination is the main destination, the process proceeds directly to step 1314.

Figure 14:
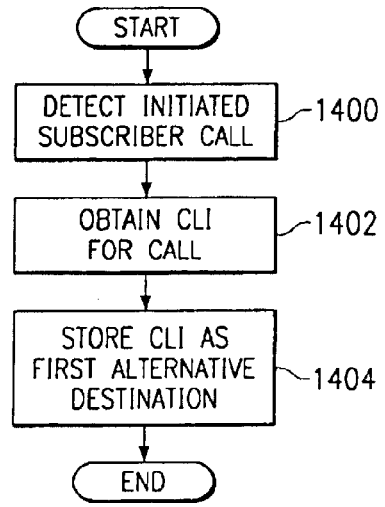
FIG. 14 is a flowchart for adapting a call routing schedule using subscriber initiated activity in accordance with a preferred embodiment of the present invention.

With reference now to FIG. 14, a flowchart for adapting a call routing schedule using subscriber initiated activity is depicted in accordance with a preferred embodiment of the present invention. The process begins by detecting a subscriber initiated call (step 1400). Thereafter, the calling line identifier (CLI) is obtained for the call (step 1402). The CLI is then stored as the first alternate destination (step 1404) with the process terminating thereafter.

The process described above in the flowcharts are used in a SCP in the depicted examples, but may be employed elsewhere depending on the implementation. For example, some of the steps may be implemented at a data processing system used by a subscriber.

Those of ordinary skill in the art will appreciate that the processes of the present invention are capable of being distributed in the form of a computer readable medium of instructions and a variety of forms for use in a communications system. Further, the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted example provides an interface through the Internet, other interfaces may be used to select and modify routing schemes. For example, the interface may be a voice response system using voice recognition which may be employed to set up, modify, and select routing mechanisms. Additionally, call routing schemes or numbers used may be sent to the user via billing records. In this manner, a subscriber may see changes to the order in which destinations are called. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for routing a call, the method comprising:

specifying a call routing schedule that is based on a current time of day;

specifying, by a subscriber, a list of functions, each function being associated with a different activity of said subscriber;

receiving a call;

identifying call routing information for the call;

routing calls according to a current time of day utilizing said call routing schedule unless function-based routing is active and a function from said list has been selected;

determining, utilizing said call routing information, whether said subscriber has activated function-based routing;

determining, utilizing said call routing information, whether said function from said list has been selected;

in response to determining that said subscriber has activated function-based routing and said function from said list of functions has been selected, overriding said call routing schedule, said selected function being used for routing calls regardless of said subscriber's current location;

routing the call using a sequence of destinations associated with the function instead of routing the call using the call routing schedule;

monitoring results from routing of the call; and automatically modifying the call routing information based on the results to form modified call routing information, wherein subsequent calls are routed using the modified call routing information.

2. The method of claim 1 further comprising:

responsive to identifying call routing information, determining whether said call routing schedule based on time has been selected for routing the call; and responsive to a determination that said call routing schedule based on time is to be used, routing the call using said call routing schedule based on time.

3. The method of claim 1, further comprising:

responsive to a determination that a function has been selected for routing the call, determining whether a time period for the function has expired;

responsive to a determination that a time period for the function has expired, routing the call; and routing the call using said call routing schedule based on time instead of using the sequence of destinations associated with the function.

4. The method of claim 1, wherein the call is routed to a subscriber associated with the function.

5. The method of claim 2 further comprising:

monitoring results from routing of the call to the subscriber; and automatically modifying the call routing information based on the results to form modified call routing information, wherein subsequent calls are routed using the modified call routing information.

6. A method in a communications system for call routing a call, the method comprising:

specifying a call routing schedule that is based on a current time of day;

specifying, by a subscriber, a list of functions, each function being associated with a different activity of said subscriber;

routing calls according to a current time of day utilizing said call routing schedule unless function-based routing is active and a function from said list has been selected;

determining, utilizing said call routing information, whether said subscriber has activated function-based routing;

determining, utilizing said call routing information, whether said function from said list has been selected;

in response to determining that said subscriber has activated function-based routing and said function from said list of functions has been selected, overriding said call routing schedule, said selected function being used for routing calls regardless of said subscriber's current location;

receiving a call to said subscriber;

routing the call to the subscriber using a sequence of destinations associated with the subscriber; and responsive to a success of routing the call to the subscriber to a destination within the sequence of destinations, automatically modifying the sequence of destinations used to call the subscriber, wherein the sequence of destinations is modified to favor destinations with successful call completions.

7. The method of claim 6, wherein the sequence of destinations is modified to favor destinations with a selected level of call completions.

8. The method of claim 6 further comprising:

responsive to detecting initiation of a call by the subscriber from an origin absent from the sequence of destinations, modifying the sequence of destinations to include the origin as a destination within the sequence of destinations.

9. The method of claim 7, wherein the origin is included as a destination within the sequence of destinations for a period of time.

10. The method of claim 7, wherein the calling line identifier is recorded to identify the origin from which the subscriber initiated the call.

11. The method of claim 6, wherein the sequence of destinations are associated with a time slot.

12. The method of claim 6, wherein the sequence of destinations are associated with said function.

13. A method in a communications system for call routing a call, the method comprising:

specifying a call routing schedule that is based on a current time of day, said call routing schedule including an ordered set of destinations;

specifying, by a subscriber, a list of functions, each function being associated with a different activity of said subscriber;

routing calls according to a current time of day utilizing said call routing schedule unless function-based routing is active and a function from said list has been selected;

determining whether said subscriber has activated function-based routing;

determining whether said function from said list has been selected;

in response to determining that said subscriber has activated function-based routing and said function from said list of functions has been selected, overriding said call routing schedule, said selected function being used for routing calls regardless of said subscriber's current location;

receiving a call to a subscriber;

identifying a time of the call;

routing the call to the first destination in said ordered set of destinations for the subscriber based on the time of the call;

responsive to an absence of an answer of the call at the first destination, routing the call to a second destination in the ordered set of destinations;

responsive to an absence of an answer of the call at the second destination, routing the call to a third destination in the ordered set of destinations; and responsive to an answer of the call at the third destination for a number of times, selecting the third alternate destination as the first alternate destination.

14. The method of claim 13, wherein the second alternate destination is selected as the first alternate destination for a temporary period of time.

15. The method of claim 14, wherein the temporary period of time is a day.

16. The method of claim 13 further comprising:

responsive to the third destination being answered over a period of time, setting the third destination as the second destination.

17. The method of claim 13 further comprising:
responsive to the second destination being answered over a period of time, setting the second destination as the first destination.

18. A switch comprising:
a call routing schedule that is based on a current time of day;
a list of functions specified by a subscriber, each function being associated with a different activity of said subscriber;
said call routing schedule for routing calls according to a current time of day unless function-based routing is active and a function from said list has been selected;
call routing information for determining whether said subscriber has activated function-based routing;
said call routing information for determining whether said function from said list has been selected;
in response to determining that said subscriber has activated function-based routing and said function from said list of functions has been selected, said call routing schedule being overridden, said selected function being used for routing calls regardless of said subscriber's current location;
an input for receiving a call for a subscriber;
signaling interface for sending a request to a database for said call routing information, wherein call routing information from the database includes a calling sequence for said function associated with the subscriber in response to the subscriber previously selecting the function; and
a switch fabric, wherein the call is routed from the input through the switch fabric to an output to a destination returned by the database using the calling sequence for the function wherein the sequence of destinations is automatically modified in response to a success of routing the call to the subscriber to a destination within the sequence of destinations and wherein the sequence of destinations is modified to favor destinations with successful call completions.

19. The switch of claim 18, wherein the request sent from the signaling interface to the database is sent to a service control point, which provides an interface to the database.

20. A service control point comprising:
a call routing schedule that is based on a current time of day;
a list of functions specified by a subscriber, each function being associated with a different activity of said subscriber;
said call routing schedule for routing calls according to a current time of day unless function-based routing is active and a function from said list has been selected;
routing information for determining whether said subscriber has activated function-based routing;
said routing information for determining whether said function from said list has been selected;
in response to determining that said subscriber has activated function-based routing and said function from said list of functions has been selected, said call routing schedule being overridden, said selected function being used for routing calls regardless of said subscriber's current location;
an input/output interface, wherein request for routing information is received from a requestor at the input/output interface and routing information returned to the requestor;
a database containing a plurality of calling sequences for subscribers; and
a processing unit connected to the input/output interface and the database; wherein the processing unit has a plurality of modes of operation including:
a first mode of operation in which the processing unit monitors for requests for said routing information;
a second mode of operation, responsive to receiving a request, in which the processing unit identifies routing information for the call;
a third mode of operation, responsive to identifying routing information for the call, in which the processing unit determines whether a function has been selected for routing the call;
a fourth mode of operation, responsive to a determination that a function has been selected for routing the call, in which the processing unit sends routing information for the call using a sequence of destinations associated with the function;
a fifth mode of operation, responsive to an absence of a determination that a function has been selected for routing the call, in which the processing unit sends routing information for the call using a call routing schedule based on time;
a sixth mode of operation for monitoring results from routing of the call; and
a seventh mode of operation for automatically modifying the call routing information based on the results to form modified call routing information, wherein subsequent calls are routed using the modified call routing information.

21. A communications system for routing a call, the communications system comprising:
a call routing schedule that is based on a current time of day;
a list of functions specified by a subscriber, each function being associated with a different activity of said subscriber;
said call routing schedule for routing calls according to a current time of day unless function-based routing is active and a function from said list has been selected;
call routing information for determining whether said subscriber has activated function-based routing;
said call routing information for determining whether said function from said list has been selected;
in response to determining that said subscriber has activated function-based routing and said function from said list of functions has been selected, said call routing schedule being overridden, said selected function being used for routing calls regardless of said subscriber's current location;
receiving means for receiving a call;
identifying means for identifying said call routing information for the call;
routing means for routing the call using a sequence of destinations associated with the function instead of routing the call using the call routing schedule;
first monitoring means for monitoring results from routing of the call; and
second modifying means for automatically modifying the call routing information based on the results to form modified call routing information, wherein subsequent calls are routed using the modified call routing information.

22. The communications system of claim 21 further comprising:
determining means, responsive to identifying call routing information, for determining whether said call routing schedule based on time has been selected for routing the call; and routing means, responsive to a determination that said call routing schedule based on time is to be used, for routing the call using said call routing schedule based on time.

23. The communications system of claim 21, further comprising:
   determining means, responsive to a determination that a function has been selected for routing the call, for determining whether a time period for the function has expired;
   first routing means, responsive to a determination that a time period for the function has expired, for routing the call; and
   second routing means for routing the call using a call routing schedule based on time instead of using the sequence of destinations associated with the function.

24. The communications system of claim 21, wherein the call is routed to a subscriber associated with the function.

25. The communications system of claim 22 further comprising:
   monitoring means for monitoring results from routing of the call to the subscriber; and
   modifying means for automatically modifying the call routing information based on the results to form modified call routing information, wherein subsequent calls are routed using the modified call routing information.

26. A communications system for call routing a call, the communications system comprising:
   a call routing schedule that is based on a current time of day;
   a list of functions specified by a subscriber, each function being associated with a different activity of said subscriber;
   said call routing schedule for routing calls according to a current time of day unless function-based routing is active and a function from said list has been selected;
   determining means for determining whether said subscriber has activated function-based routing;
   determining means for determining whether said function from said list has been selected;
   in response to determining that said subscriber has activated function-based routing and said function from said list of functions has been selected, said call routing schedule being overridden, said selected function being used for routing calls regardless of said subscriber's current location;
   receiving means for receiving a call to a subscriber;
   routing means for routing the call to the subscriber using a sequence of destinations associated with the subscriber; and
   modifying means, responsive to a success of routing the call to the subscriber to a destination within the sequence of destinations, for automatically modifying the sequence of destinations used to call the subscriber, wherein the sequence of destinations is modified to favor destinations with successful call completions.

27. The communications system of claim 26 further comprising:
   modifying means, responsive to detecting initiation of a call by the subscriber from an origin absent from the sequence of destinations, for modifying the sequence of destinations to include the origin as a destination within the sequence of destinations.

28. The communications system of claim 27, wherein the origin is included as a destination within the sequence of destinations for a period of time.

29. The communications system of claim 27, wherein the calling line identifier is recorded to identify the origin from which the subscriber initiated the call.

30. The communications system of claim 26, wherein the sequence of destinations are associated with a time slot.

31. The communications system of claim 26, wherein the sequence of destinations are associated with a function.

32. A communications system for routing a call, the communications system comprising:
   a call routing schedule that is based on a current time of day;
   a list of functions specified by a subscriber, each function being associated with a different activity of said subscriber;
   said call routing schedule for routing calls according to a current time of day unless function-based routing is active and a function from said list has been selected;
   call routing information for determining whether said subscriber has activated function-based routing;
   said call routing information for determining whether said function from said list has been selected;
   in response to determining that said subscriber has activated function-based routing and said function from said list of functions has been selected, said call routing schedule being overridden, said selected function being used for routing calls regardless of said subscriber's current location;
   receiving means for receiving a call to a subscriber;
   routing means for routing the call using call routing information associated with the subscriber;
   monitoring means for monitoring results from routing of the call to the subscriber; and
   modifying means for automatically modifying the call routing information based on the results to form modified call routing information, wherein subsequent calls are routed using the modified call routing information.

33. The communications system of claim 32, wherein the means of routing the call comprises:
   first routing means for routing the call to a main destination; and
   second routing means, responsive to an absence of an answer at the main destination, for routing the call to an alternate destination.

34. A communications system for routing a call, the communications system comprising:
   a call routing schedule that is based on a current time of day;
   a list of functions specified by a subscriber, each function being associated with a different activity of said subscriber;
   said call routing schedule for routing calls according to a current time of day unless function-based routing is active and a function from said list has been selected;
   said call routing schedule being overridden when a determination is made that said subscriber has activated function-based routing and said function from said list has been selected, said selected function being used for routing calls regardless of said subscriber's current location;
   receiving means for receiving a call to a subscriber;
   identifying means for identifying a time of the call;
   first routing means for routing the call to the first destination in an ordered set of destinations for the subscriber based on the time of the call;
   second routing means, responsive to an absence of an answer of the call at the first destination, for routing the call to a second destination in the ordered set of destinations;
   responsive to an absence of an answer of the call at the second destination, routing the call to a third destination in the ordered set of destinations;

responsive to an answer of the call at the third destination for a number of times, selecting the third alternate destination as the first alternate destination.

35. The communications system of claim 34, wherein the second alternate destination is selected as the first alternate destination for a temporary period of time.

36. The communications system of claim 35, wherein the temporary period of time is a day.

37. The communications system of claim 34, further comprising:
setting means, responsive to the third destination being answered over a period of time, for setting the third destination as the second destination.

38. The communications system of claim 34 further comprising:
setting means, responsive to the second destination being answered over a period of time, for setting the second destination as the first destination.

39. A computer program product in a computer readable medium for routing a call, the computer program product comprising:
instructions for specifying a call routing schedule that is based on a current time of day;
instructions for specifying, by a subscriber, a list of functions, each function being associated with a different activity of said subscriber;
instructions for routing calls according to a current time of day utilizing said call routing schedule unless function-based routing is active and a function from said list has been selected;
instructions for determining, utilizing said call routing information, whether said subscriber has activated function-based routing;
instructions for determining, utilizing said call routing information, whether said function from said list has been selected;
in response to determining that said subscriber has activated function-based routing and said function from said list of functions has been selected, instructions for overriding said call routing schedule, said selected function being used for routing calls regardless of said subscriber's current location;
first instructions for receiving a call;
second instructions for identifying call routing information for the call;
third instructions for routing the call using a sequence of destinations associated with the function;
fourth instructions for monitoring results from routing the call; and
fifth instructions for automatically modifying the call routing information based on the results to form modified call routing information, wherein subsequent calls are routed using the modified call routing information.

40. A computer program product in a computer readable medium for call routing a call, the computer program product comprising:
instructions for specifying a call routing schedule that is based on a current time of day;
instructions for specifying, by a subscriber, a list of functions, each function being associated with a different activity of said subscriber;
instructions for routing calls according to a current time of day utilizing said call routing schedule unless function-based routing is active and a function from said list has been selected;
instructions for determining, utilizing said call routing information, whether said subscriber has activated function-based routing;
instructions for determining, utilizing said call routing information, whether said function from said list has been selected;
in response to determining that said subscriber has activated function-based routing and said function from said list of functions has been selected, instructions for overriding said call routing schedule, said selected function being used for routing calls regardless of said subscriber's current location;
first instructions for receiving a call to a subscriber;
second instructions for routing the call to the subscriber using a sequence of destinations associated with the subscriber; and
third instructions, responsive to a success of routing the call to a subscriber to a destination within the sequence of destinations, for automatically modifying the sequence of destinations used to call the subscriber, wherein the sequence of destinations is modified to favor destinations with successful call completions.

41. A computer program product in a computer readable medium for routing a call, the computer program product comprising:
instructions for specifying a call routing schedule that is based on a current time of day;
instructions for specifying, by a subscriber, a list of functions, each function being associated with a different activity of said subscriber;
instructions for routing calls according to a current time of day utilizing said call routing schedule unless function-based routing is active and a function from said list has been selected;
instructions for determining, utilizing said call routing information, whether said subscriber has activated function-based routing;
instructions for determining, utilizing said call routing information, whether said function from said list has been selected;
in response to determining that said subscriber has activated function-based routing and said function from said list of functions has been selected, instructions for overriding said call routing schedule, said selected function being used for routing calls regardless of said subscriber's current location;
first instructions for receiving a call to a subscriber;
second instructions for identifying a time of the call;
third instructions for routing the call to the first destination in an ordered set of destinations for the subscriber based on the time of the call;
fourth instructions, responsive to an absence of an answer of the call at the first destination, for routing the call to a second destination in the ordered set of destinations;
fifth instructions, responsive to an absence of an answer of the call at the second destination, for routing the call to a third destination in the ordered set of destinations;
sixth instructions, responsive to an answer of the call at the third destination for a number of times, for selecting the third alternate destination as the first alternate destination.

* * * * *

UNITED STATES PATENT AND TRADEMARK OFFICE
CERTIFICATE OF CORRECTION

PATENT NO. : 6,898,274 B1  
DATED : May 24, 2005  
INVENTOR(S) : Galt et al.

It is certified that error appears in the above-identified patent and that said Letters Patent is hereby corrected as shown below:

<u>Title page,</u>  
Item [57], ABSTRACT,  
Line 11, after "call routing" delete "scheduled" and insert -- schedule --.

<u>Column 12,</u>  
Line 24, before "described" delete "process" and insert -- processes --.

<u>Column 19,</u>  
Line 48, after "routing" insert -- of --.

Signed and Sealed this

Ninth Day of May, 2006

JON W. DUDAS  
*Director of the United States Patent and Trademark Office*